(12) United States Patent  
Graves et al.

(10) Patent No.: US 8,751,401 B1  
(45) Date of Patent: *Jun. 10, 2014

(54) SYSTEM AND METHOD FOR SECURELY AUTHORIZING AND DISTRIBUTING STORED-VALUE CARD DATA

(71) Applicant: e2interactive, Inc., Atlanta, GA (US)

(72) Inventors: Phillip Craig Graves, Atlanta, GA (US); Merrill Brooks Smith, Ft. Lauderdale, FL (US)

(73) Assignee: e2interactive, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,247

(22) Filed: Feb. 21, 2014

Related U.S. Application Data

(63) Continuation of application No. 10/655,828, filed on Sep. 5, 2003, now Pat. No. 8,706,630.

(51) Int. Cl.  
*G06Q 40/00* (2012.01)

(52) U.S. Cl.  
USPC ............... 705/44; 705/35; 705/36 R; 705/37; 705/38; 705/39; 705/40; 235/375; 235/379; 235/380; 235/381; 235/382; 235/385

(58) Field of Classification Search  
CPC .......................................... G06Q 20/10–20/40  
USPC ............................... 705/35–44; 235/375–385  
See application file for complete search history.

(56) References Cited

U.S. PATENT DOCUMENTS

| | | | | |
|---|---|---|---|---|
| 5,721,768 | A * | 2/1998 | Stimson et al. | 379/114.16 |
| 5,903,633 | A * | 5/1999 | Lorsch | 379/114.2 |
| 6,304,915 | B1 * | 10/2001 | Nguyen et al. | 709/250 |
| 6,366,967 | B1 * | 4/2002 | Wagner | 710/33 |
| 6,381,631 | B1 * | 4/2002 | van Hoff | 709/202 |
| 6,502,745 | B1 * | 1/2003 | Stimson et al. | 235/375 |
| 8,676,672 | B2 * | 3/2014 | Nelsen | 705/30 |
| 2002/0065712 | A1 * | 5/2002 | Kawan | 705/14 |
| 2005/0051619 | A1 * | 3/2005 | Graves et al. | 235/380 |

* cited by examiner

*Primary Examiner* — Narayanswamy Subramanian  
(74) *Attorney, Agent, or Firm* — Landmark Intellectual Property Law, PC

(57) ABSTRACT

A computerized system and method for securely authorizing and distributing stored-value card data over a communications network is provided. The method allows for storing in the database a plurality of records comprising stored-value card data for each stored-value card as well as information identifying a plurality of trusted sources of stored-value card activation requests and/or a plurality of trusted communications networks for transmitting stored-value card activation requests. A transmitting step allows for a requesting terminal to transmit over a communications network a request to change the status of a stored-value card. The central processor then determines whether the requesting terminal and/or the communications network is a trusted source. Based on whether the requesting terminal or communications network is a trusted source or trusted communications network, the request can be processed and the card can be activated. A method for establishing a list of trusted sources and trusted communications networks is also provided.

17 Claims, 10 Drawing Sheets

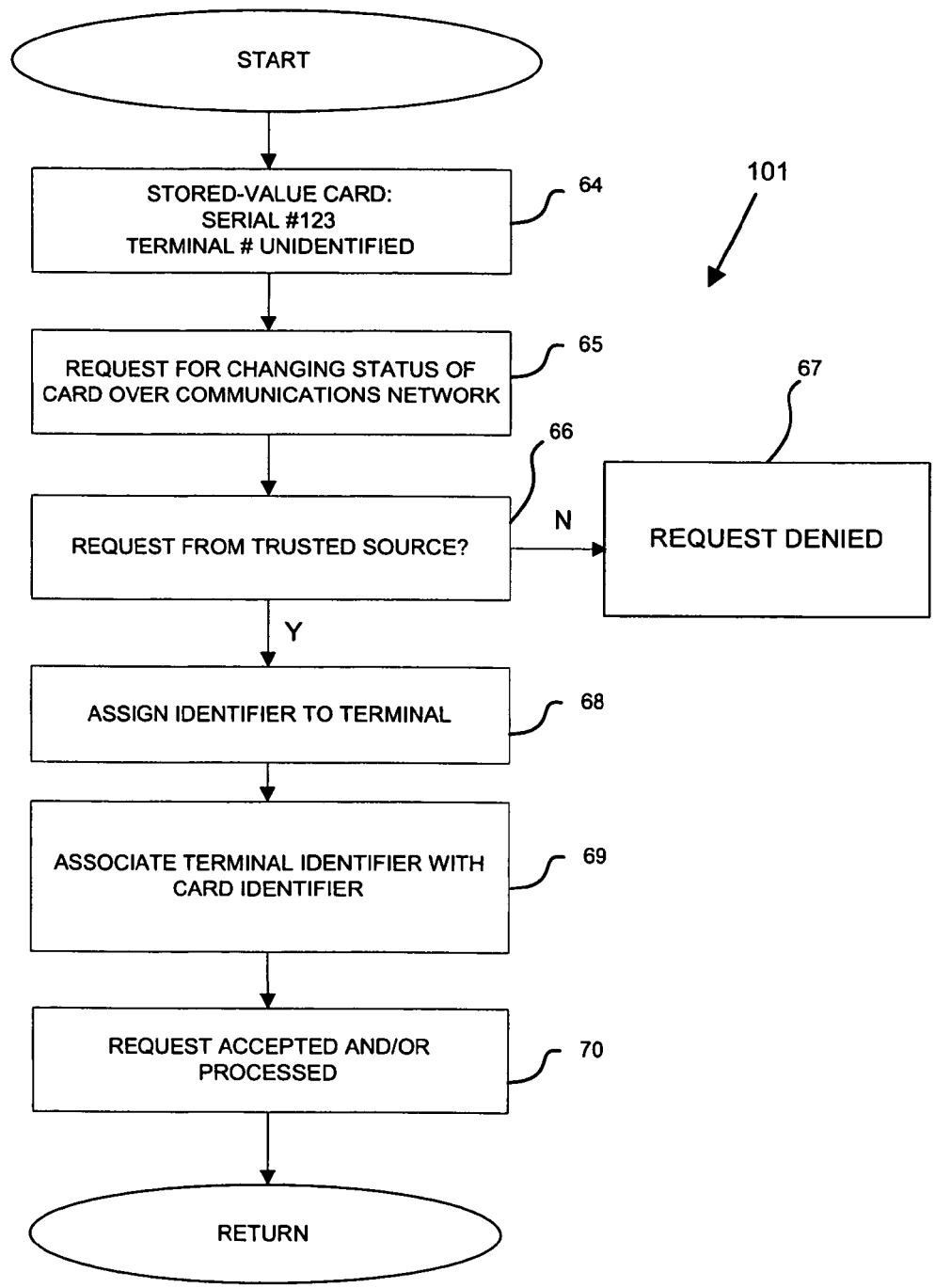

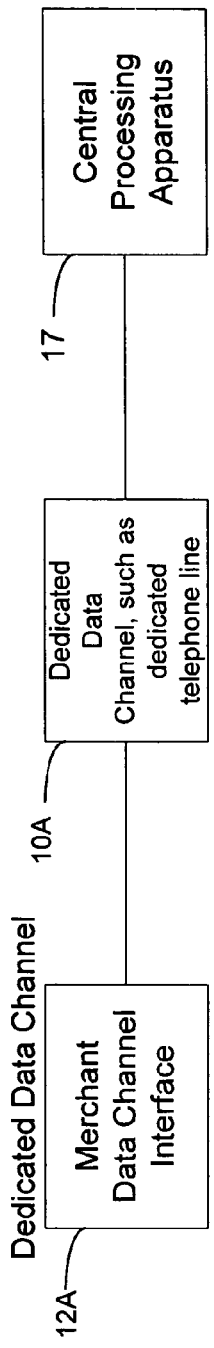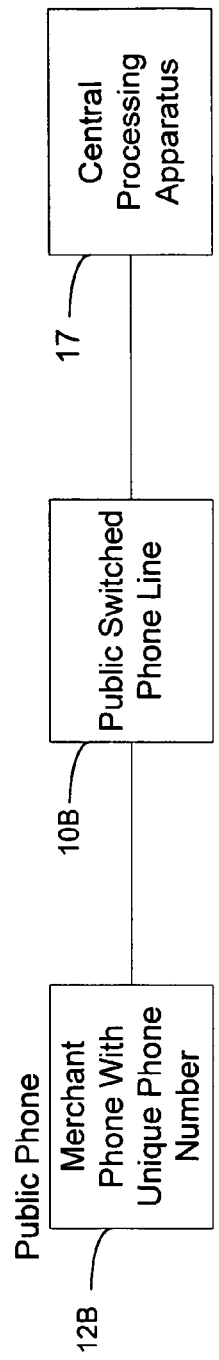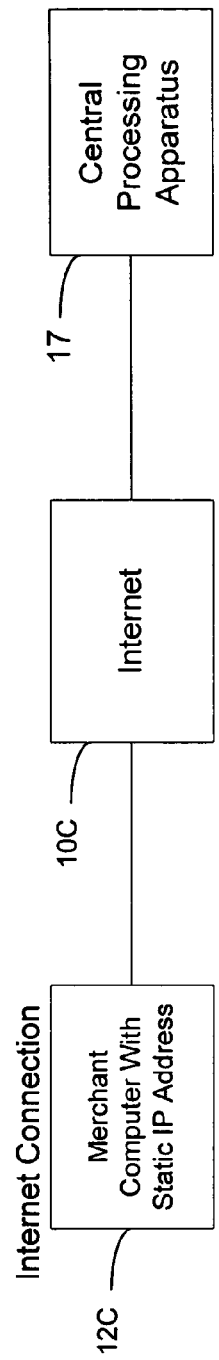

SYSTEM AND METHOD FOR SECURELY AUTHORIZING AND DISTRIBUTING STORED-VALUE CARD DATA

RELATED APPLICATIONS

This application is a continuation of U.S. application Ser. No. 10/655,828, filed on Sep. 5, 2003, which is a continuation-in-part of U.S. application Ser. No. 10/411,971, filed Apr. 11, 2003, now U.S. Pat. No. 7,083,084, which is a continuation of U.S. application Ser. No. 09/641,363 filed on Aug. 18, 2000, now U.S. Pat. No. 6,575,361, which claims priority to U.S. Provisional Application No. 60/149,740 filed on Aug. 19, 1999, all of which are incorporated herein by reference. This application is related to U.S. application Ser. No. 10/253,243 filed on Sep. 24, 2002 and International Application No. PCT/US02/30281 filed Sep. 24, 2002, which claim priority to U.S. Provisional Application No. 60/396,404 filed Jul. 15, 2002 and U.S. Provisional Application No. 60/324,333 filed on Sep. 24, 2001, which are all incorporated herein by reference.

FIELD OF THE INVENTION

The present invention is generally related to remote data authorization and distribution. More particularly, the present invention is related to a system and method for securely authorizing and distributing stored-value card data between a plurality of users and a central processor over a communications network.

BACKGROUND OF THE INVENTION

Stored-value cards can be authorized and distributed over communications networks. Examples of communications networks include dedicated telephone lines, public telephone links, and the internet or other networked communication. The data of the stored-value cards is related to services and/or products prepaid by the owner or end user of the card. Examples of prepaid services that may be accommodated by the stored-value data include long distance telephone communication, wireless communication, paging and internet-enabled communication services, including wireless web access. Other examples of prepaid services and/or products that may be accommodated by the stored-value card include gift cards, prepaid gas cards, prepaid grocery cards, prepaid entertainment cards, downloadable ring tone cards, downloadable game cards, downloadable music cards that use MP3, MP4, WMV, WAV, or other music formats, any other downloadable software card, customer rewards cards, and any other type of stored-value cards for products, services, or both, that may be prepaid by the owner of the card.

Stored-value cards, such as prepaid long distance phone cards, are generally used in the telephone industry to allow customers to pre-purchase long distance calling time. Each of the cards has a printed identification number. Associated identification information can be magnetically stored therein or printed in a barcode. The identification number is also stored in a file in a database maintained by the card issuer. In the traditional business model, when the cards are sent to the retail location from which they will be sold, the corresponding records in the database are activated, thus allowing the card to be used immediately by a customer. To use the card as a prepaid long distance card, the customer dials a toll free number to access the card issuer's system, enters the identification number, and then makes the desired long-distance call.

These prior art prepaid phone card systems have several disadvantages. For example, since the cards are active while on the shelf in the retail location, the cards may be stolen by a thief and easily used. One way to address some of the drawbacks of prior art prepaid phone card systems would be to install activation terminals unique to the prepaid card issuer. This is referred to as a "closed system." U.S. Pat. No. 5,577,109 to Stimson et al. discloses such a closed system. In the Stimson system, the cards are not preactivated. Each of the retail locations from which cards are to be sold is provided with a dedicated activation terminal which allows the retail operator to set the value of the card at the time of the sale. The activation terminal connects to the card issuer's system to pass along the value amount and to request activation of the card. Depleted cards can be recharged in the same manner as they are sold. A serious disadvantage of the Stimson system is that it requires single-function dedicated hardware to be installed in each retail location, resulting in a very inflexible and expensive system.

U.S. Pat. No. 6,000,608 to Dorf provides a multifunction card system including a prepaid phone card activating system which allows cards to be purchased in varying amounts and to be recharged without requiring the use of a closed system to handle the transactions. Although Dorf purports to alleviate some of the drawbacks of Stimson by using point-of-sale devices connected to a banking system, it is believed that Dorf fails to verify sources of card activation requests so as to enhance detection of potential security breaches that could ensue in any system accessible to a large number of users.

It would be further desirable to provide a system and method for selectively processing stored-value card requests, such as stored-value card activation, deactivation, and/or value change, based on the communications network over which the request is transmitted. Additionally, it would be further desirable to provide a system and method for selectively processing stored-value card requests based on the source of the request, wherein such request can be received over a variety of communications networks that are available to unauthorized users. It would be further desirable to provide a method of determining a plurality of communications networks and a plurality of sources of activation requests that are authorized to carry or make valid requests, respectively, either prior to or at the same time as such requests are made.

BRIEF SUMMARY OF THE INVENTION

Generally speaking, the foregoing needs are fulfilled by providing in one exemplary embodiment a computerized method for securely authorizing and distributing stored-value card data over a communications network. The method allows for storing in the database a plurality of records comprising stored-value card data for each stored-value card and a plurality of records comprising information identifying trusted sources of requests to change the status of a stored-value card and/or information identifying trusted communications networks known to transmit valid requests. Trusted sources can include any requestor, including merchant terminals on a dedicated line, merchant terminals at a particular or identified phone number, and merchant terminals at a particular or identified internet IP address. Trusted communications networks that are identified to be trusted sources may comprise the internet when the requestor has a static IP address or any other computer network such as a WAN or LAN, a dedicated data line such as a dedicated phone line, and a public switched telephone network that provides automatic number identification (ANI). A transmitting step allows for transmitting a request to change the status of a stored-value card over a communications network from a requesting terminal to the central processor. Such communications networks comprise dedicated data lines such as dedicated phone lines, frame relay or X.25 circuits, public telephone links such as a public switched telephone network, and the internet, including networks wherein the merchant terminal is part of a WAN or LAN. The central processor is configured to receive requests from merchant terminals over one or more communications networks and determine whether the respective terminal is a trusted source and/or whether the request was transmitted over a trusted communications network. A processing step allows for processing the request based on the determining step.

In yet another aspect thereof, the present invention fulfills the foregoing needs by providing a computer-readable medium encoded with computer program code for securely authorizing and distributing stored-value card requests over a communications network, the program code causing a computer to execute a method comprising: controlling a database coupled to the central processor; storing in the database a plurality of records comprising stored-value card data for each stored-value card as well as information identifying trusted sources for making stored-value card processing requests and/or information identifying trusted communications networks for carrying or transmitting stored-value card processing requests; receiving a request for processing the stored-value card over a communications network from a requesting terminal to the central processor; determining whether the respective requesting terminal is a trusted source of requests for processing and/or whether the communications network is a trusted communications network for carrying or transmitting requests for processing; and processing the request based on the determining step.

Other embodiments can be considered.

In yet another aspect thereof, the present invention fulfills the foregoing needs by providing a method for securely authorizing stored-value card transactions. The method includes an identifying step for identifying one or more trusted sources of stored-value card processing requests and/or one or more trusted communications networks for carrying and/or transmitting stored-value card processing requests. An assigning step allows for identifiers to be assigned to each identified trusted source and trusted communications network. A storing step allows for storing the identifiers in a database coupled to a processor configured to receive a request to process stored-value cards, wherein the request is received from a user terminal over a communications network. In another step, it is determined whether the respective requesting terminal is a trusted source of requests for processing and/or it is determined whether the communications network is a trusted communications network for carrying or transmitting requests for processing. Finally, the method allows for processing the request based on the determining step.

Other embodiments can be considered.

In yet another aspect thereof, the present invention fulfills the foregoing needs by providing a system for authorizing stored-value card requests over a communications network between a plurality of terminals and a central processor. The system comprises a database coupled to the central processor. The system also comprises a storage module configured to store in the database a plurality of records comprising stored-value card data for each stored-value card as well as information identifying trusted sources for making stored-value card processing requests and/or information identifying trusted communications networks for carrying or transmitting stored-value card processing requests. The system also comprises a value module configured to define in each stored record a parameter corresponding to the value of each respective stored-value card; a first processing module configured to process a request from a respective requesting terminal to the central processor, the central processor configured to accept the request based on whether the request originated from a trusted source and/or whether the request was transmitted or carried by a trusted communications network.

Other embodiments could be considered.

According to yet another embodiment of the invention, a method for securely authorizing stored-value card transactions is provided. The method comprises identifying one or more trusted sources of stored-value card processing requests and/or one or more trusted communications networks for carrying and/or transmitting stored-value card processing requests. An assigning step allows for assigning identifiers to each identified trusted source and trusted communications network. A storing step allows for storing the identifiers in a database coupled to a processor. A receiving step allows for receiving a request to process stored-value cards, wherein the request is received from a user terminal over a communications network. A determining step allows for determining whether the respective requesting terminal is a trusted source of requests for processing and/or determining whether the communications network is a trusted communications network for carrying or transmitting requests for processing. Finally, a processing step allows for processing the request based on the determining step.

Other embodiments could be considered.

DESCRIPTION OF THE DRAWINGS

FIG. 7 is an exemplary flow chart illustrating another aspect of the present invention as may be implemented by the system of FIG. 4;

FIGS. 5A, 8B, and 8C are block diagrams illustrating different types of communications networks;

Figure 1:
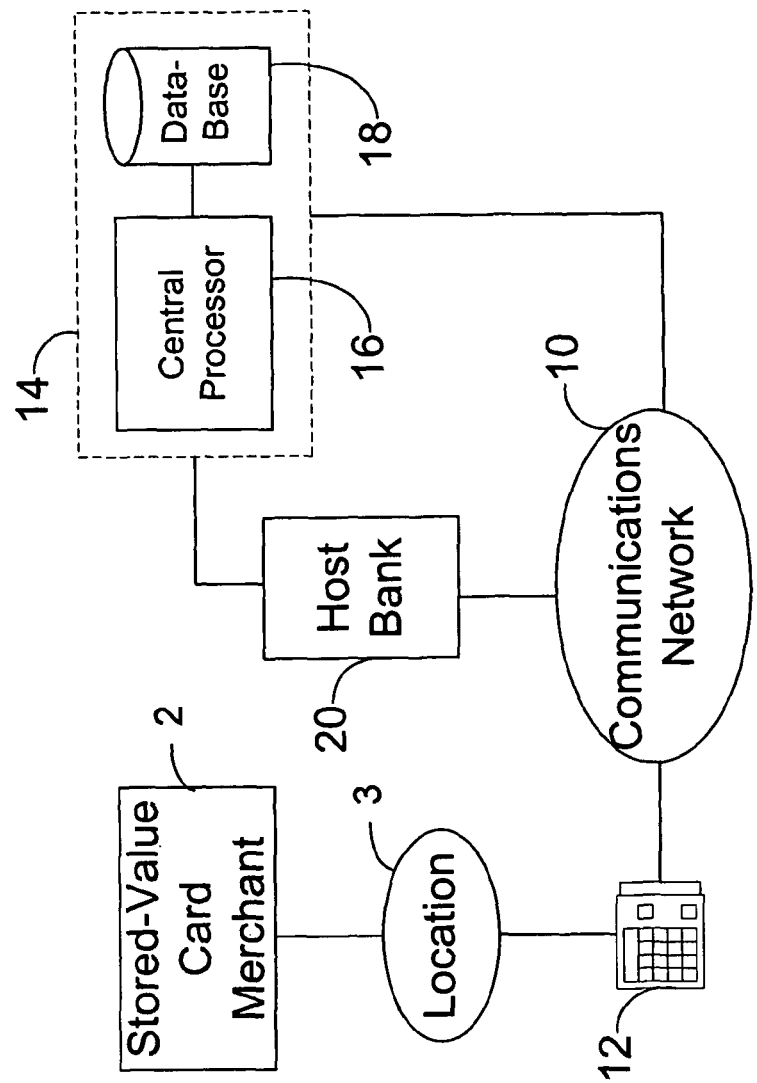
FIGS. 1-4 respectively illustrate schematic block diagrams showing how various exemplary stored-value card user trees, as shown in FIGS. 1-3, may be connected via a communications network to a remote stored-value card data management system embodying the present invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIGS. 1-4 illustrate examples of entity trees that may benefit from the system and techniques of the present invention.

For simplicity of illustration, the customer/distributor layer at the top is omitted. Each distributor can have subordinate to it any of the illustrated types of structures. Note that in each case, a merchant 2 is at the top, with a layer of locations 3 just above a layer of terminals 12.

Figure 2:
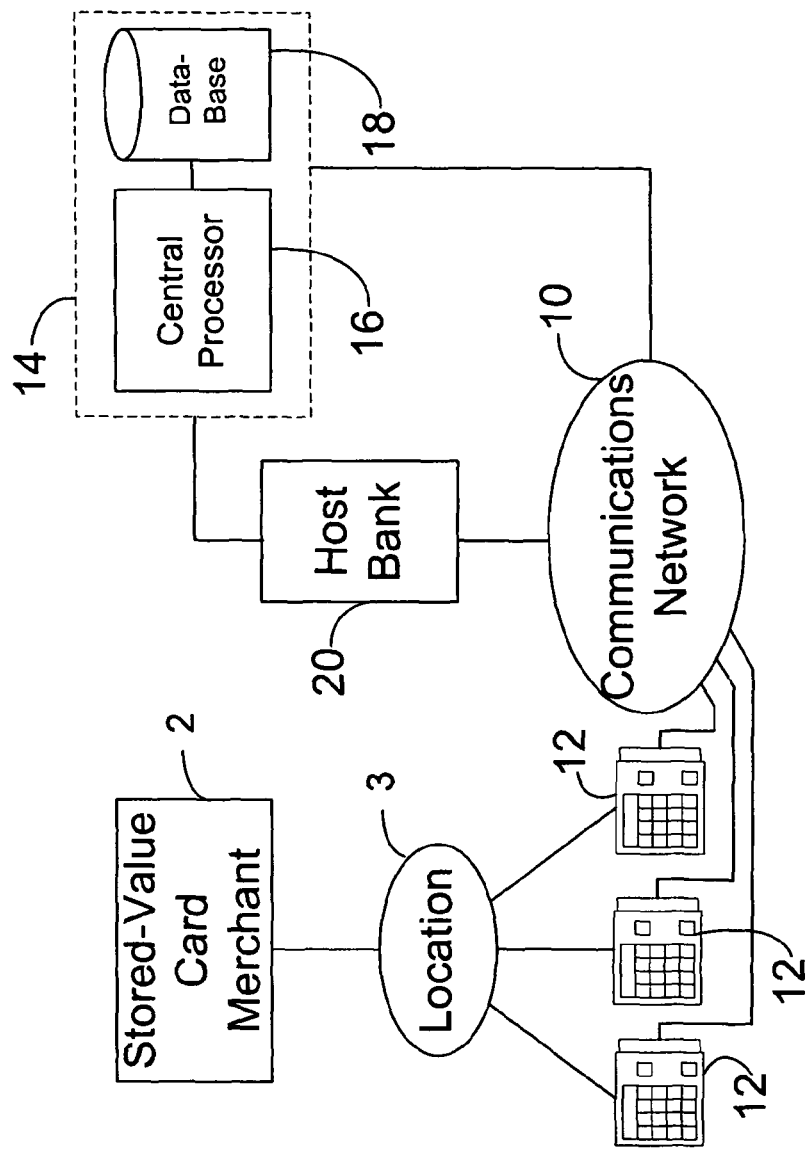
Figure 3:
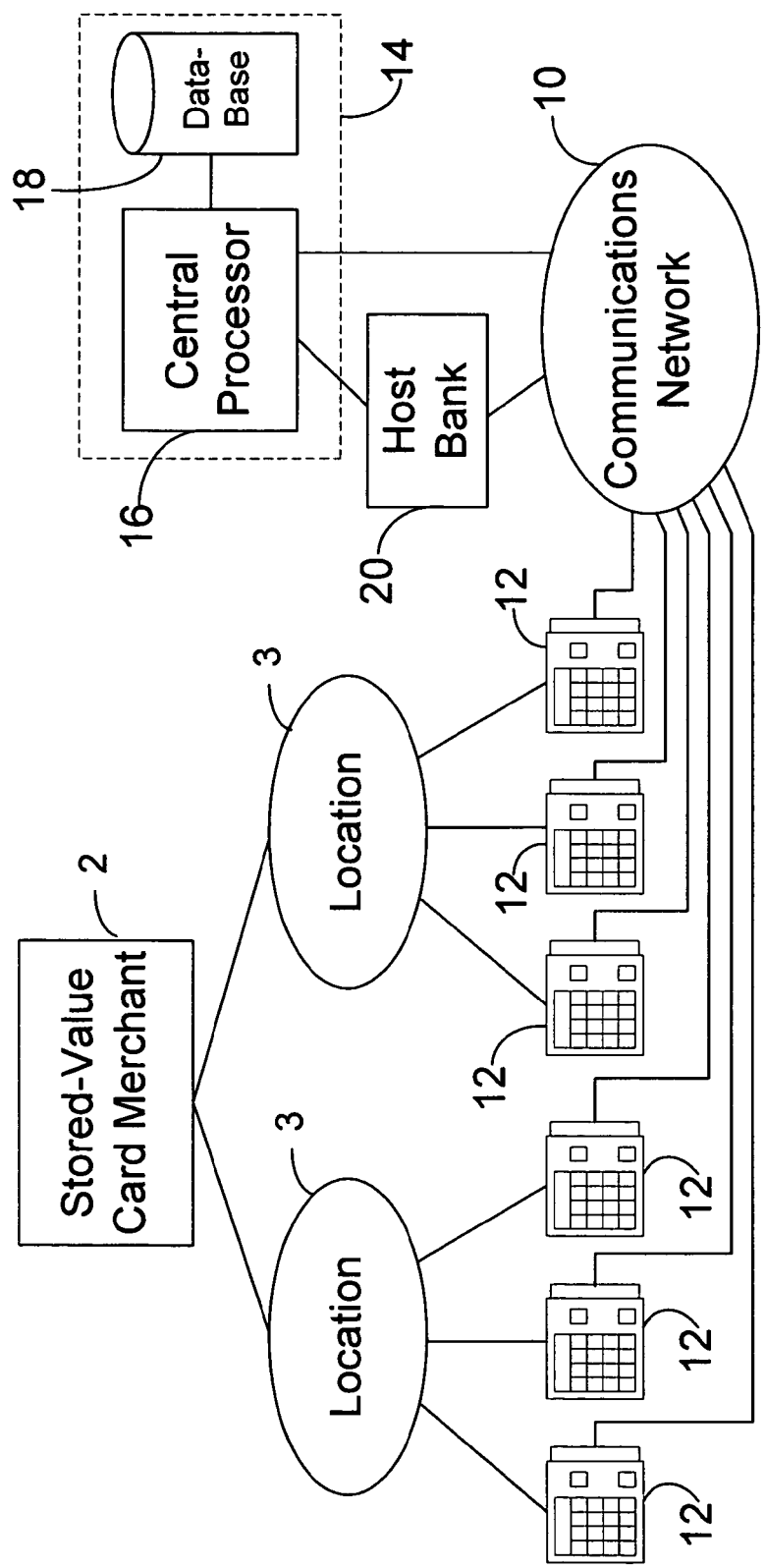

As shown in FIGS. 1 through 3, by way of a communications network 10, e.g., a public switched phone network, a wireless network, a dedicated data circuit such as a dedicated phone line, a credit or debit card network, the Internet, an intranet, etc., over which credit or debit card transactions are authorized or denied, and/or a point-of-sale terminal 12, e.g., a credit or debit card terminal, is used to send an authorization request to a stored-value card data management system 14, such as may be managed and operated by the assignee of the present invention. System 14 comprises a central processor 16 coupled to a database 18. The central processor 16 can be a host computer, a computer server, a computer system with software applications that receive transactions and process them according to preset rules, and any other computer system. The database 18 stores a plurality of records including stored-value card data for each stored-value card issued by the assignee of the present invention. The database can also store information identifying trusted sources for making stored-value card processing requests, such as requests to activate a stored-value card, and it can additionally store information identifying trusted communications networks for carrying or otherwise transmitting stored-value card processing requests. The identification information can be a telephone number, a static IP address, a password, a PIN, a merchant and/or terminal ID, or another unique code that can be associated with a particular user, merchant terminal, or communications network. The code may be chosen by a user at the terminal, randomly assigned, or selected from a list of codes by the central processor 16 and assigned to the terminal. It will be appreciated that in the case of a credit or debit card network, each stored-value card transaction request is expected to be handled, on average, within a certain time period such as approximately two seconds, or else one could lose its certification to use that network.

A respective requesting terminal, using the communications network 10, may send an authorization request through a suitable host bank 20 to the central processor. The authorization request could also be routed straight to the communications network 10 without passing through a host bank 20. FIGS. 1 through 3 show an exemplary link architecture between the communications network and the central processor, optionally through the host bank. That is, the link architecture allows communication of card related data from the merchant, to the communications network, which in one exemplary embodiment would be the Visa network for a Visa-routed transaction, to the host bank, and then to the central processor. It will be appreciated that other link architectures may be implemented, such as a host-to-host architectural connection. In this case, the communications network, such as a dedicated link or the internet, would be directly between a merchant's "host" system and a "host" system of the assignee of the present invention. Thus, the present invention is not limited to applications that require a host bank being that a host-to-host connection does not require any host bank or Visa network to transfer the card-related data to the central processor.

The authorization request may include information about the card swiped and the terminal used to swipe it, such as the electronic signature of that terminal, an IP address of the terminal, a phone number of the terminal, or a password provided by the terminal. It should be appreciated that other methods may be used to capture identification of the card besides swiping it; for instance, the information can be barcode-scanned or entered manually at a keypad of a computer. Further, merchant terminals 12 may be any system that can transmit card identifier information over a communications network. Thus, merchant terminals 12 can be telephones, electronic cash registers, credit card machines, fax machines, computers, or other devices that can receive and transmit information.

Figure 4:
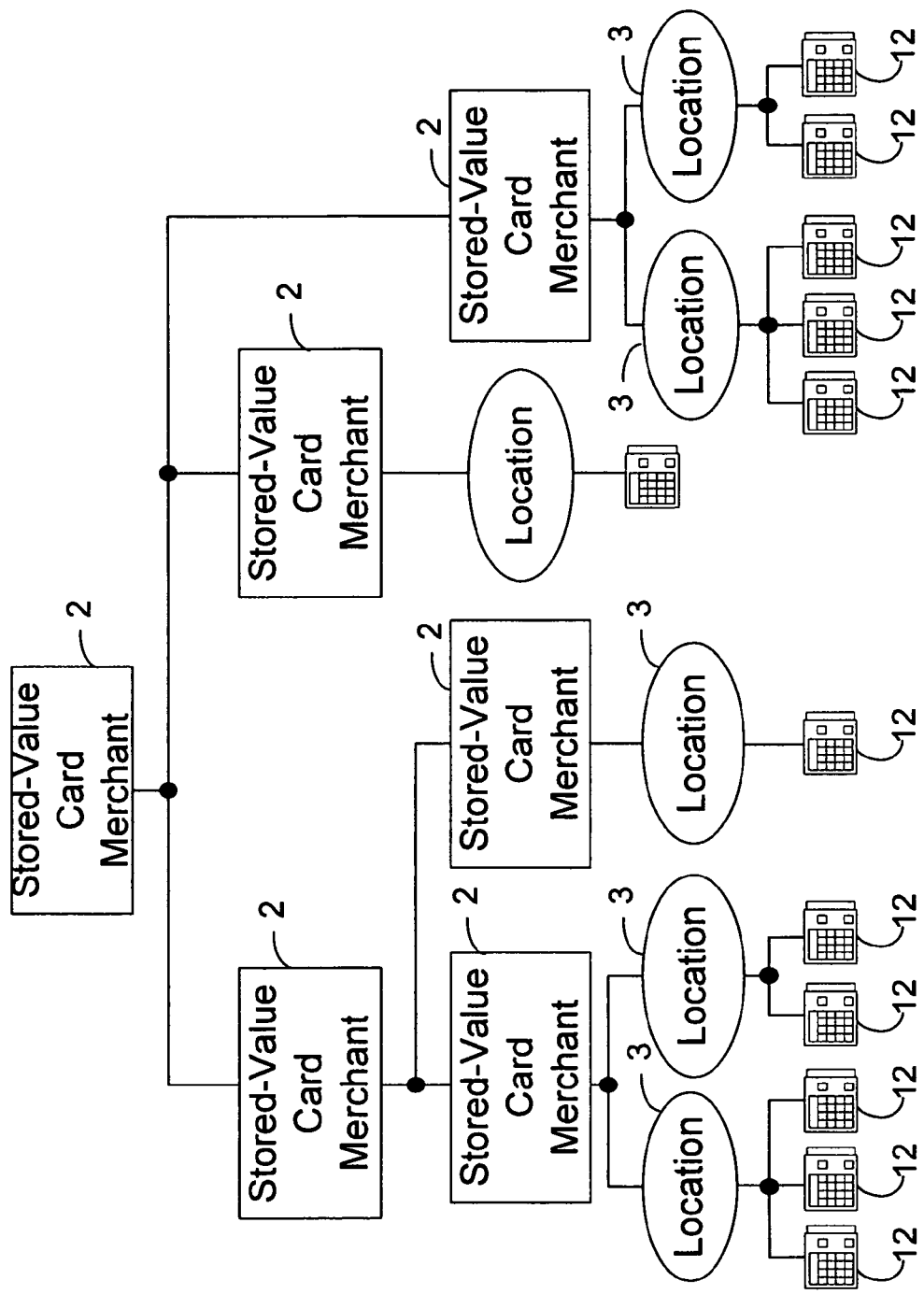

In another aspect of the system of the present invention, as shown in FIGS. 3 and 4, merchants and terminals can be divided into groups, membership of which varies depending on whether the context of the grouping is for the purpose of executing any specific action out of a set of actions that a respective user may execute, such as card activation, billing, commission payments, reporting, inventory management, etc. For example, terminal A from Merchant X may be in activation group I with terminal B from merchant Y, yet for billing purposes the two terminals may be in different groups. Also, Merchant X may be affiliated with terminals A, B, and C, and thus A, B, and C may be classified in the same group. Merchant X may also be grouped with Merchant Y and its terminals D, E, and F. In this way, terminals A-F may be in the same activation group for instance. The central processor can be preconfigured to determine whether a terminal is a trusted source based on whether the requestor is in the same group as another terminal or merchant that is considered a trusted source.

Terminals in a given group can share a communications network. For instance, all the terminals in a given group may share a dedicated data line that connects them to the central processor. Requests can then be authorized when the central processor recognizes that the request was received via the dedicated data line and determines that the dedicated data line is a trusted source. Similarly, terminals in a given group can share a set of static IP addresses. In one embodiment, terminals are assigned static IP addresses when they log on to a server operated by an entity associated with the group. The server entity assigns a terminal an IP address selected from a defined set of IP addresses. Each of the IP addresses in the defined set is a trusted source and therefore has identifying information stored at the database.

Management and definition of these groups is the responsibility of a module configured to store in the database a list of trusted sources and trusted communications networks. The database can also include a table indicative of the set of actions that a respective user may execute from a respective terminal.

FIG. 4 shows an exemplary entity tree for a store-value card merchant 2. One or more merchant terminals 12 are located at a particular location 3 of a merchant, such as a particular store location. One or more locations 3 will be associated with a stored-value card merchant 2. Stored-value card merchants 2 may then be affiliated or otherwise associated with other stored-value card merchants 2, which may in turn have further affiliations with additional stored-value card merchants 2. By means of such a stored-value card merchant 2 network, a given merchant 2 may be associated with one or more locations 3 and terminals 12 through other merchants 2. For the sake of simplicity of illustration, blocks representing the stored-value card data management system and other associated blocks are not shown in the user entity trees shown in FIG. 4. It will be appreciated, however, that each of such user entity trees will be similarly interconnected to the stored-value card data management system 14 as exemplarily illustrated in FIGS. 1 through 3 or as further described herein.

Figure 5:
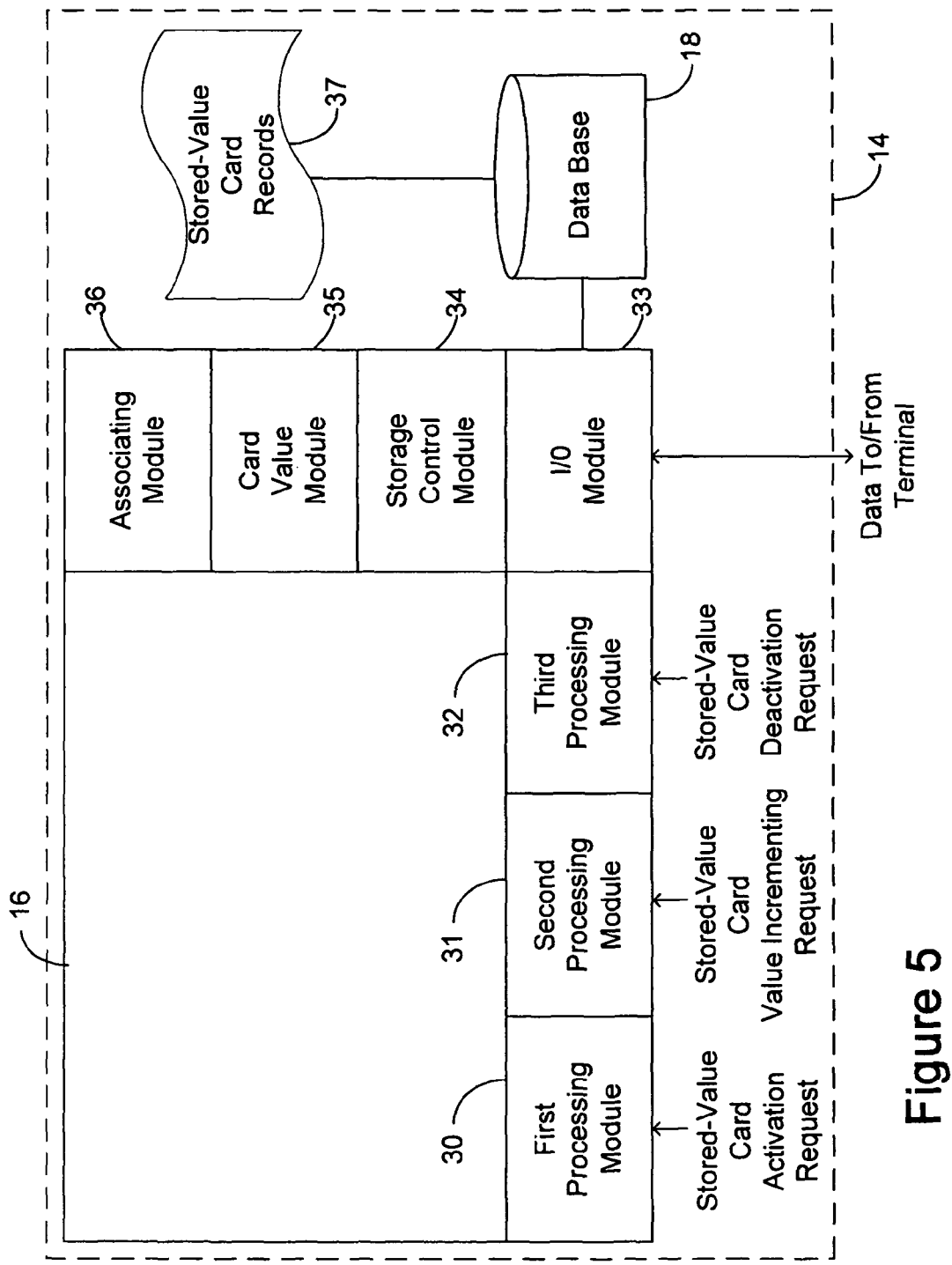
FIG. 5 is an exemplary modular architecture of the telecommunications card data management system shown in FIGS. 1-3.

FIG. 5 illustrates further details in connection with stored-value card data management system 16. As shown in FIG. 5, central processor 16 includes a storage control module 34 that allows for storing in database 18 a plurality of stored-value card records 37 comprising stored-value card data for each stored-value card, information identifying trusted sources for making stored-value card processing requests, and information identifying trusted communications networks for carrying or transmitting stored-value card processing requests. An associating module 36 allows for associating in each stored record respective identifiers that uniquely match a respective stored-value card and a respective terminal, or to match a card or terminal with other associated identifier information. A card value module 35 allows for defining in each stored record a parameter corresponding to the value of each respective stored-value card. That parameter could comprise a monetary amount corresponding to the value of each respective stored-value card or such parameter could comprise time units corresponding to the value of each respective stored-value card, or both. The card value module 35 may also allow for defining the parameters or methods by which a card's value can be changed.

Stored-value card data transmitted over the communications network may be received by input/output module 33 so that a first processing module 30 may process a request of stored-value card activation to the central processor from a respective requesting terminal. The central processor thus allows for accepting or declining an activation request, or other processing request, based on whether the request is from a trusted source or whether the request is transmitted over a trusted communications network.

The processing modules may also comprise modules for changing value, refreshing value, redeeming value, switching the value to another product, service, or currency, or otherwise changing the status of the stored-value card. Other processing modules can be considered. The refreshing module may change the value of the card back to the card's original value. Alternately, the refreshing module may add the card's original value to the current value of the card. For instance, via the refreshing module, a card with a current value of $15 and an original value of $20 could be increased to $20 (original value) or to $35 (current value plus original value), depending on the type of refreshing module. Generally speaking, values can be changed in predetermined increments (like $10) or any amount that is not predetermined. The redeeming module may refund to the customer the value of the card or a portion of the value of the card, or it may provide a monetary or other credit to the customer's account. It may also convert the value of the card into other goods or services offered by the merchant, merchant partner(s), or any other entity associated with the sale of the card, including the central processing station.

In one aspect of the present invention, the stored-value card may only be authorized if the request is made by any of a set of trusted sources, or made through a communication that travels over a trusted communications network. Through means described above, terminals that are trusted sources can be associated with respective identifiers by the associating module 36. However, trusted sources may not have any associated identifiers before a given transaction; instead, trusted sources may be verified to be trusted sources through means described herein.

As further shown in FIG. 5, data from the terminal is received at the I/O module 33. In one embodiment, information about the communications network used to make the request can be identified to the first processing module 30 based on the source of the request signal received at the I/O module 33. For instance, a dedicated data line may have a dedicated input at the I/O module 33, and requests made over the dedicated line will therefore be recognized to be transmitted by the dedicated data line because they are received at the I/O module 33 through the dedicated input. Alternately, a dedicated data line can carry or add identification information as an addition to the request communication. For instance, a dedicated data terminal can be preconfigured to transmit the series of numbers "1234567" before or after every merchant terminal communication in order to identify that the merchant terminal communication is being transmitted over the dedicated data line. In this embodiment, the central processor 16 can then determine that the request was made over a dedicated line by analyzing the information identifying the dedicated data line.

A first processing module 30 configured to process a request of stored-value card activation will analyze this data and send back either an authorization or a disapproval to the requesting terminal. For instance, a first processing module 30 can access the database through the I/O module 33 and compare the information of the terminal with a list of trusted sources stored in the database. If the information of the terminal matches a trusted source data entry in the database, the request will be authorized. If authorized, a database coupled to the central processor can be updated to reflect any authorization or disapproval. A similar process can be used when information is received over a trusted communications network. The first processing module 30 identifies the communications network used to make the request and grants the request if it determines that the communications network is a trusted one. The first processing module 30 can make this determination by itself or by comparing identification information of the communications network to a list of trusted communications networks stored at the database 18.

As further shown in FIG. 5, a second processing module 31 allows for processing a request for changing the value associated with a respective stored-value card. The request is transmitted over the communications network to the central processor from a respective requesting terminal. The central processor thus further allows for accepting or declining the change value request based on whether the respective identifiers stored in the record for the stored-value card whose associated value is to be changed match the identifiers actually transmitted by the requesting terminal for that stored-value card and terminal. A third processing module 32 allows for processing a request of stored-value card deactivation to the central processor from a respective requesting terminal. In this case, the central processor is configured to accept or decline the deactivation request based on whether the request is from a trusted source or whether the request is transmitted over a trusted communications network.

Figure 6:
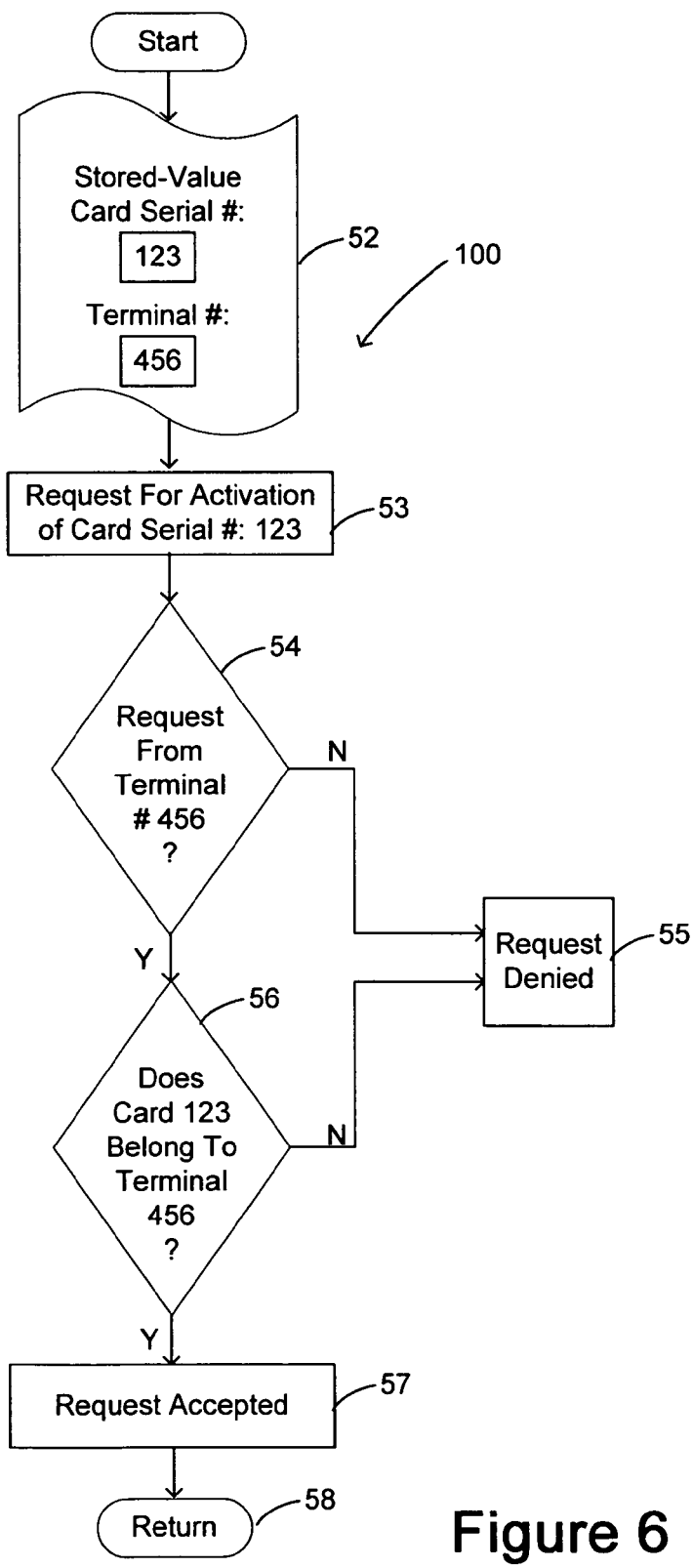
FIG. 6 is an exemplary flow chart illustrating one aspect of the present invention as may be implemented by the system of FIG. 5.

FIG. 6 illustrates an exemplary flow chart 100 such as may be implemented by a stored-value card data management system embodying one aspect of the present invention. The method described in this flowchart is preferably used when a requesting terminal has already been assigned an associated identifier, such as the number 456 as used in the following example. As shown in step 52, a stored-value card serial No. 123 is associated with terminal No. 456. In step 53, a request for activation of stored-value card serial No. 123 is processed. In one embodiment, it may be processed as follows. A verification module would allow for determining whether that request came from terminal No. 456, as in step 54. Then the verification module determines whether card 123 has been assigned to the location containing No. 456, as shown in step 55. If the verification module determines that in fact such request was generated from terminal No. 456, and card 123 has been assigned to the location containing terminal 456, then the central processor would generate a message indicating that the request has been accepted, as in step 57. If the verification module determines that the requesting terminal is other than No. 456, or if the card is not assigned to the location, then a message would be issued declining the transaction, as shown in step 56.

FIG. 7 illustrates an exemplary flow chart 101 such as may be implemented by a stored-value card data management system embodying one aspect of the present invention. As shown in steps 64 and 65 of FIG. 7, a terminal with no associated identifier makes a request for changing the status of a stored-value card with exemplary serial No. 123, which serial number has not been associated with any terminal. The request may then be processed as follows. In step 66, a verification and/or authorization module would allow for determining whether the request originated from a trusted source, such as a source identified in the central processor's database. The operation of the verification module depends on the type of communications network on which the request was made, as shown further in FIG. 8. If the request is not from a trusted source, then the request is denied or otherwise held or halted in step 67. Appropriate action may then be taken, such as attempting to identify or locate the requestor or merchant terminal, or invalidating the stored-value card with the identified serial number.

If the request is determined to be from a trusted source, then the request will continue to be processed. As shown in step 68, the unidentified merchant terminal may then be assigned an identifier, and the identifier may then be associated with the stored-value card identifier as in step 69. The request is then processed and/or accepted in step 70.

FIGS. 8A, 8B and 8C illustrate various exemplary communications networks, which can be used to verify that a request is made from a trusted source. In FIG. 8A, a merchant data channel interface 12A communicates with a central processing apparatus 17, which can be a central processor, host bank, or other centralized entity, via a dedicated data channel between a merchant and the central processing apparatus, such as dedicated telephone line 10A. Because the communications network is a dedicated data channel, only the merchant and the central processing apparatus have access to the communications network, in addition to those entities that may be granted access to the communications network by the merchant and central processing apparatus. Thus, the central processor authorizes all requests made over the dedicated data channel because such requests are deemed to be from a terminal affiliated with the trusted merchant who has access to the dedicated line. In this embodiment, the central processing apparatus determines that the request is from a trusted source if the request is received over a dedicated data source.

It may be appreciated that the central processing unit 16 can then add the requestor to the list of trusted sources by storing information identifying the trusted source in the database 18. This could be accomplished by assigning an identifier, such as a password or code, to the requestor and storing said identifying information in the database 18 as a trusted source. Then, if the requestor later makes a request over a communications network that is not considered a trusted communications network, like a public switched telephone network, then the requestor can identify itself over the network while making a request. The central processor 16 can then determine that the requestor is a trusted source and accordingly grant the request. That requestor may then be classified as a trusted source for subsequent transactions so that future requests will be automatically granted.

One way the processor can determine that future requests from a particular trusted requestor are indeed from the trusted requestor is to assign identifying information to the requestor at the time the requestor is first determined to be a trusted source, such as when the requestor makes a request over a trusted communications network like a dedicated data line. In this embodiment, the processor 16 communicates the identifying information to the requestor over the communications network 10 and also stores the information in its database 18. When the trusted source makes subsequent requests over any communications network, it includes the identifying information in its request to the processor 16. The processor receives the request with the accompanying identifying information. It can then compare the identifying information to the records stored in the database 18. By comparing the identifying information to the identifying information stored in the database 18, the processor can determine whether the merchant is a trusted source.

In one exemplary embodiment of FIG. 8A, ABC Stores, Inc. ("ABC"), a hypothetical trusted source, has a dedicated data line connecting one or more of its merchant terminals to a central processing apparatus. ABC opens a new ABC store with new merchant terminals that are as yet unknown to the central processing apparatus. In particular, the ABC store has been assigned no identifying information, and the database does not contain any information specifically identifying this particular ABC store. The unidentified terminal of the new store makes a request over the dedicated line. Although the central processing apparatus has never verified the identity of the new ABC terminals, the central processing apparatus will process and grant the request because it treats all requests made over ABC's dedicated line as a request made by a trusted source. In effect, any requestor on a dedicated line is automatically a trusted source. Other embodiments can be considered.

However, in another exemplary embodiment, the new ABC store terminal must first obtain an identifier before its request can be granted. Upon receiving the request and determining that the request was received over a dedicated line that is a trusted source, the central processing apparatus assigns an identifier to the requesting terminal and associates the identifier with the stored-value card's identifier. Then the request can be processed and the card can be activated. Other embodiments can be considered.

In another embodiment, the central processing apparatus sets up an identifier before the request. For instance, ABC notifies the central processor that a new ABC store is opening soon, and an identifier is reserved for that new ABC store in the event that a terminal at the new ABC store makes a request. Then when the requesting entity makes a request, the requesting identity is already identified. In this instance, the request could be processed without the step of assigning an identifier to the new terminal. However, additional identification could be added and/or assigned at the time of the first request as needed. For instance, the new store could be issued a default password, and then the new store could request and/or obtain a new password when it makes its first request to the central processor.

In FIG. 8B, an unidentified merchant with a unique phone number 12B communicates a request for a stored-value card to a central processing apparatus 17, such as a central processor 16, over a public switched phone line 10B. Such communication may use a modem, an interactive voice response system (IVR), or any other means of communicating over a public switched telephone network. The central processing apparatus can identify the unique phone number of the merchant based on the DNIS and ANI numbers that are carried on regular phone calls. Similarly, the "caller ID" feature can be used to identify the phone number of entities contacting a remote entity over a public switched phone line. The central processing apparatus can then determine if the identified phone number is a trusted source by comparing the merchant terminal's phone number with the phone numbers of the trusted sources stored in the database 18. If the central processing apparatus 17 determines that the phone number does belong to a trusted source, then the central processing apparatus 17 will process and grant the request. Otherwise, the request may be rejected.

Other methods of identifying merchant terminals can be considered.

In the embodiment of FIG. 8B, the merchant 12B communicates a request for a stored-value card to a central apparatus over a public switched phone line 10B. The merchant 12B enters a password or other identifying information over the phone line, such as by transmitting a series of tones during a phone call with a central processing apparatus 17. Other methods of communicating identification information over a phone line can be considered, such as by fax or interne communication. The central processing apparatus 17 then compares the identifying information of the merchant 12B with identifying information of the trusted sources listed in the database 18. Based on the comparison, the central processing apparatus determines whether the merchant 12B is a trusted source. If the central processing apparatus 17 determines that the merchant 12B is a trusted source, then the central processing apparatus 17 will process and grant the request. Otherwise, the request may be rejected. Other embodiments can be considered.

In FIG. 8C, a merchant computer terminal with a static IP (interne protocol) address submits a request by communicating with the central processing apparatus 17 via the internet 10C. Through methods well known in the art, a merchant computer terminal can connect to the internet through a modem, LAN, WAN, cable connection, or other internet connection. The merchant terminal is assigned a static IP address by its internet service provider, which could be a merchant, merchant group, or another service provider. The merchant terminal 12C communicates a request to the central processing apparatus 17. Through methods well known in the art, the central processing apparatus 17 determines the static IP address of the terminal 12C based on the received electronic communication. By comparing the static IP address with the static IP addresses of trusted sources, the central processing apparatus 17 can determine if the terminal 12C is a trusted source. If it is, then in a method similar to that described above for FIGS. 8A and 8B, the central processing apparatus 17 processes the request and activates the card. If it is not determined to be a trusted source, then the request may be rejected.

In one embodiment, the request is accompanied by information identifying the merchant computer terminal 12C. For instance, the merchant terminal 12C may enter a password, which is transmitted from the merchant computer 12C with a static IP address to the central processing apparatus 17. Through methods described above, the central processing apparatus 17 can then determine whether the merchant terminal 12C is a trusted source based on the password. If the merchant computer 12C is a trusted source, then the IP address may become a trusted source, such as by storing the IP address in the list of trusted sources in the database. However, because in some cases a given merchant computer 12C may have a different IP address the next time it logs onto the internet, the central processing apparatus 17 may purge such static IP addresses unless the merchant computer 12C is otherwise known to have a permanent static IP address.

In another embodiment, the central processing apparatus 17 does not store the IP address as a trusted source. In this embodiment, verification of the identification at the beginning of the request is sufficient to authorize the transaction, and no further authorization steps are necessary. Other embodiments can be considered.

In one embodiment, due to an arrangement with the merchant terminal's 12C internet service provider, the merchant has the same static IP address for every internet session. The central processing apparatus 17 stores this address in the database as an identifier for a trusted source. The merchant 12C makes a request over the internet from the same static IP address, and the central processing apparatus 17 processes and grants such request after it identifies the request as originating from a trusted static IP address, such as a trusted static IP address of a merchant terminal 12C.

In another embodiment, the merchant 12C will be assigned one of a set of static IP addresses, each of which are trusted sources. The merchant 12C can then make requests that will be processed, as described above, because it will always make such request using a static IP address that is a trusted source.

Figure 9:
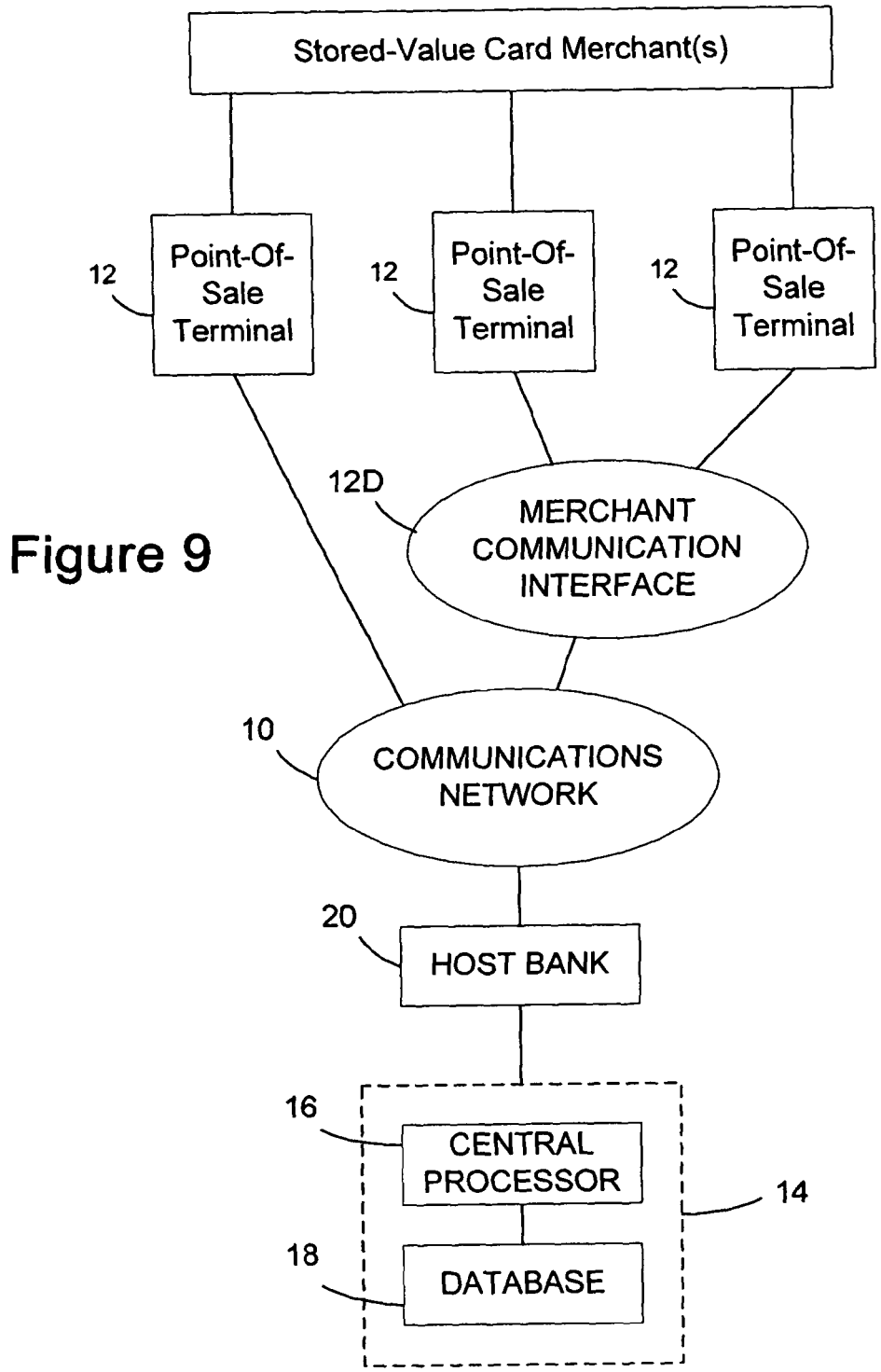
FIG. 9 is a block diagram illustrating an exemplary user tree and communication path of requests for stored-value cards between terminals and the central processor.

FIG. 9 shows an exemplary user tree and communication path between a merchant terminal and the host bank and central processor. As illustrated in FIG. 9, point-of-sale terminals 12 can communicate with the host bank and central processor by interfacing first with a merchant communication interface 12D. The merchant communication interface 12D can be connected to any number of point-of-sale terminals 12, which in turn can be connected to any number of merchants. The merchant communication interface 12D may itself be a point-of-sale terminal 12. For instance, the point-of-sale terminals 12 and the merchant communication interface 12D may be computers connected on a LAN (local area network) or a WAN (wide area network). Communications from multiple terminals 12 may first pass through a merchant network hub before the communications leave the merchant and pass through other communications networks such as the internet, a dedicated line, or an outside phone system.

Alternately, in FIG. 9, as in FIGS. 1 and 2, the point-of-sale terminal can interface directly with the communications network.

It must be noted that in the above FIGS. 7-9, the requesting terminal or other requesting entity may not have a prior identifier associated with it before the first request. Thus, to this extent, the requesting entity is not identified to the central processor and host bank. However, other information may already be known about the requesting entity. In the ABC example described for FIG. 8A above, the data management system 14 could already determine that the requestor was an ABC entity, such as an ABC store terminal, because only ABC entities have access to the dedicated line. It should be appreciated that the step of associating an identifier with a previously unidentified terminal can be removed entirely. It should also be appreciated that these methods apply equally to the request/activation process over phone lines and the internet.

Those skilled in the art may also appreciate that the service provider and/or card value can be chosen by the user upon purchase or activation, or at any time chosen by the user. When the requesting entity such as a merchant terminal requests a card or PIN, the requesting entity asks for a specific dollar, minute, or other value for the card. The central processor could then simply alter the existing record for the card, if one exists, in order to reflect a higher or lower dollar amount as requested by the user over the communications network. E.g., a customer could request that a given amount, such as $50, be assigned to a particular card. During the process of authenticating the transaction, the central processor could edit its records to reflect the new card value. Thus, card values can be variable. This is true whether the card values are initially fixed, or whether their value is unidentified and unassigned until the point of sale. Similarly, in the case of telecommunications service or any other kind of user services applicable to stored-value cards, the user may select the service provider at the point of sale, or later if the card must be redeemed by the user at a later date. At any point when the user interacts with the central processor, that processor has the ability to amend and alter the identifiers associated with a card as well as any other associated information, such as the card's current value or face value.

The stored-value card data management system in one exemplary embodiment enables a web-based, ID and password protected application available to anyone with internet access and the appropriate ID and Password. As described-above, the system comprises respective modules for card generation, merchant establishment, location establishment, terminal setup, and inventory assignment to merchants and/or locations. The system may also be used for other card-related actions, such as web-based activation, deactivation, value change, refresh, and value redemption.

The present invention can be embodied in the form of computer-implemented processes and apparatus for practicing the processes described above. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

Figure 10:
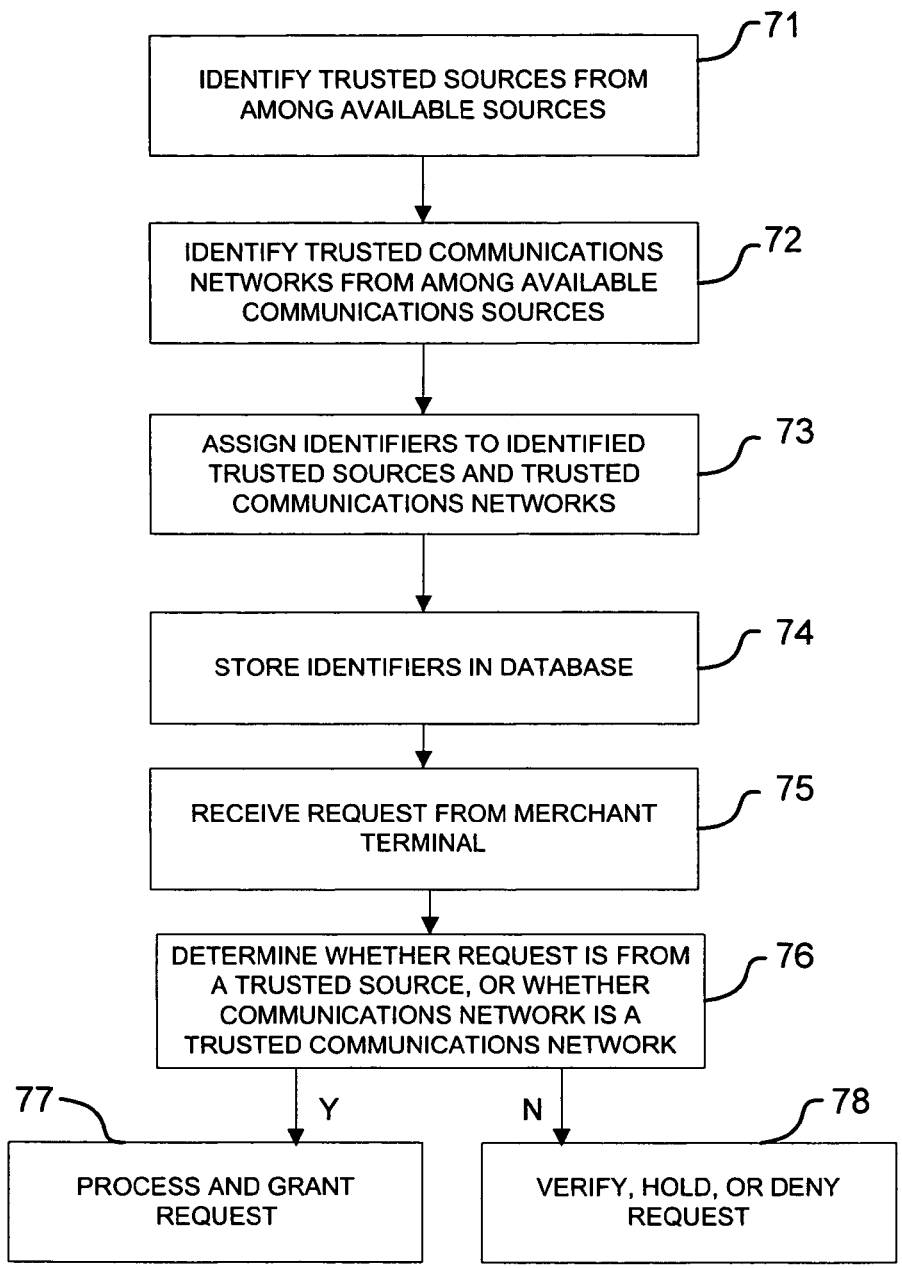
FIG. 10 is an exemplary flow chart illustrating another aspect of the present invention as may be implemented by the system of FIG. 3.

FIG. 10 is an exemplary flow chart illustrating another aspect of the present invention as may be implemented by the system of FIG. 3. In step 71, a person(s), processor, computer, or other entity identifies one or more trusted sources that are authorized to make stored-value card requests. The trusted sources may include, in a preferred embodiment, a list of merchants authorized to request PINs. Similarly, in step 72, an entity identifies one or more trusted communications networks that are known to carry or transmit only valid stored-value card requests. The trusted communications networks may include, in a preferred embodiment, a list identifying the various dedicated data lines connecting authorized merchants or merchant terminals to the central processor. Steps 71 and 72 are described separately, but it should be understood that these two steps need not be done in order. Further, the system should be constantly updating its list of trusted sources as new sources and networks are determined to be trusted sources.

In step 73, an entity such as the central processor 16 assigns identification information to the identified trusted sources and identified trusted communications networks. The identification information may be a merchant terminal ID number or other identifier, such as a static IP address or phone number. For communications networks, the identifier may be an internal code used to identify a particular communications network from another network. For instance, different communications networks that have different inputs into the processor system can be identified by assigning different numbers to the different inputs. In step 74, the identifiers are stored in a database 18. It should be noted that communications networks may not have identifiers in the traditional sense of the word, and such identifiers may not be amenable to storing in a database. For instance, trusted communications networks may be identified by virtue of having a different connection or input to the processor than communications networks that are not trusted, and thus they can be identified by virtue of having the separate connection.

In step 75, a request is received from a merchant terminal. Here, merchant terminal can mean any entity that submits a request to the processor. In step 76, the processor determines whether the request is from a trusted source, i.e., whether the requesting merchant terminal is a trusted source. The processor can make its determination based on information identifying the requestor. For instance, requestors can be verified to be trusted sources by correctly entering a password over a phone network. Phone requestors can also be verified by determining that the requestor's phone number is listed in the database as a trusted source. Requestors who request over the internet can be verified by having made the request from a trusted static IP address, or from a static IP address known to have previously submitted a correct password. The processor verifies the sources by comparing their identifier information such as passwords with the identification information stored in the database 18.

The processor also determines whether the communications network carrying the request is a trusted communications network. If the request carries an identifier that identifies the communications network, the processor can compare the identifier with the trusted identifiers in the database. This verification process can also be done by simply determining how the request arrived at the processor. For instance, if input #3 is a trusted source and the processor determines that the request arrived via input #3, then the processor can determine that the request was carried by a trusted source. Other methods can be used, which are well-known in the art.

If the request is determined to be from either a trusted source or a trusted communications network, then the request is processed and granted in step 77. If the request is not determined to be from a trusted source or trusted communications network, then in step 78 the request may be denied, other means of verification can be pursued, or the request can be put into a hold category.

Other embodiments can be considered. For instance, for many of the embodiments described above, the request can be any request, including a request for activation, deactivation, value change, or another request.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

The invention claimed is:

1. A computerized method for authorizing and conducting transactions associated with a stored-value card, the method comprising:

storing in a database coupled to a central processor a plurality of records comprising identifiers of merchant locations, if any, and communications networks for carrying or transmitting stored value card processing requests, if any, that are authorized to request transactions for one or more stored-value cards;
receiving at the central processor:
a transaction request associated with a stored value card; and
the identifier of the merchant location or the communication network requesting the transaction;
determining at the central processor whether the received identifier of the merchant location or communication network is stored or noted in the database as authorized for requesting the transaction;
if the received identifier is of a merchant location and it is determined that the merchant location is stored or noted in the database as authorized for requesting the transaction, conducting or authorizing the transaction; and
if the received identifier is of a communication network and it is determined that the communication network is stored or noted in the database as authorized for requesting the transaction, capturing an identifier of the merchant location from which the transaction request was sent over the communications network and storing the identifier of the merchant location in the database as authorized for requesting future transactions, if not already stored in the database, and conducting or authorizing the transaction.

2. The computerized method of claim 1, wherein said stored-value card is selected from the group consisting of: a gift card, a prepaid gas card, a prepaid grocery card, a prepaid entertainment card, a card used for downloading ring tones, a card used for downloading software, a card used for downloading music files and a customer rewards card.

3. The computerized method of claim 1, wherein the communications network is a dedicated data circuit.

4. The computerized method of claim 1, wherein the specific processing request is a request to activate, deactivate, reload, refresh, or refund the stored value card.

5. The computerized method of claim 1, wherein the merchant location is identified by one or more internet protocol (IP) addresses, and the determining step is based on whether one or more of the IP addresses are recorded in the database as authorized to request transactions for one or more stored-value cards.

6. The computerized method of claim 1 wherein the identifiers of merchant locations are selected from the group consisting of: a telephone number, an IP address, a password or code, a geographic address, or a name.

7. The computerized method of claim 1, wherein the database further comprises one or more stored value card records associated with one or more stored-value cards.

8. The computerized method of claim 7, wherein the stored value card records comprise information identifying merchant locations or communications networks that are authorized to request transactions for the stored value cards.

9. The computerized method of claim 8, wherein the determination at the central processor of whether the received identifier of the merchant location or communication network is authorized for requesting the transaction is based on whether identifiers received by the merchant location for a transaction associated with a specific stored value card match or correspond to identifiers stored in the stored value card record associated with the specific stored-value card.

10. The computerized method of claim 1, wherein said stored-value card is a card for a purpose, selected from the group consisting of: downloading music files, downloading games, enabling long distance telephone communication, enables wireless communication, enables paging services, enables interne communication services, and enables wireless web access.

11. The computerized method of claim 1, further comprising:
receiving at the central processor a request to add stored value to a customer account, the request including an indicia, wherein the indicia is associated with the stored-value, and wherein the customer account is managed by a provider; and
providing from the central processor a provider-specific indicia associated with the provider to the customer, wherein the provider-specific indicia is effective to add the associated stored value to the customer account.

12. A computerized method for authorizing and conducting transactions associated with a stored-value, the method comprising:
storing in a database coupled to a central processor a plurality of records comprising identifiers of merchant locations, if any, and communications networks for carrying or transmitting stored value processing requests, if any, that are authorized to request transactions for one or more types of stored-value;
receiving at the central processor:
a transaction request associated with a stored value; and
the identifier of the merchant location or the communication network requesting the transaction;
determining at the central processor whether the received identifier of the merchant location or communication network is stored or noted in the database as authorized for requesting the transaction;
responsive to a determination that merchant location is stored or noted in the database as authorized for requesting the transaction, conducting or authorizing the transaction; and
responsive to a determination that the communication network is stored or noted in the database as authorized for requesting the transaction, capturing an identifier of the merchant location from which the transaction request was sent over the communications network and storing the identifer of the merchant location in the database as authorized for requesting future transactions, if not already stored in the database, and conducting or authorizing the transaction.

13. The computerized method of claim 12, wherein the database further comprises one or more stored value records associated with one or more types of stored-value.

14. The computerized method of claim 13, wherein the one or more types of stored value comprises different types of value, different value denominations, or different values with redemption limitations.

15. The computerized method of claim 14, wherein the different values with redemption limitations comprise stored values that are redeemable with one or more providers of goods or services.

16. The computerized method of claim 13, wherein the stored value records comprise information identifying merchant locations or communications networks that are authorized to request transactions for the stored value.

17. The computerized method of claim 13, wherein the determination at the central processor of whether the received identifier of the merchant location or communication network is authorized for requesting the transaction is based on whether identifiers received by the merchant location for a transaction associated with a specific stored value match or correspond to identifiers stored in the stored value record associated with the specific stored-value.

* * * * *

UNITED STATES PATENT AND TRADEMARK OFFICE
CERTIFICATE OF CORRECTION

PATENT NO.         : 8,751,401 B1
APPLICATION NO.    : 14/186247
DATED              : June 10, 2014
INVENTOR(S)        : Phillip Craig Graves et al.

Page 1 of 1

It is certified that error appears in the above-identified patent and that said Letters Patent is hereby corrected as shown below:

In the Specification

Column 11, Line 18: The word "interne" should read --internet--

Column 11, Line 30: The word "interne" should read --internet--

Signed and Sealed this
Twenty-sixth Day of August, 2014

Michelle K. Lee
*Deputy Director of the United States Patent and Trademark Office*